(12) United States Patent
Billion Laroute et al.

(10) Patent No.: US 8,556,560 B2
(45) Date of Patent: Oct. 15, 2013

(54) TAPPED INSERT TO BE INSERT MOULDED AND INSERT MOULDING METHOD

(75) Inventors: David Billion Laroute, Saint Laurent du Pont (FR); Nicolas Bégel, Chambéry (FR); Frédéric Palluel, Chambéry (FR)

(73) Assignee: Bollhoff Otalu S.A., La Ravoire (FR)

( * ) Notice: Subject to any disclaimer, the term of this patent is extended or adjusted under 35 U.S.C. 154(b) by 333 days.

(21) Appl. No.: 13/012,404

(22) Filed: Jan. 24, 2011

(65) Prior Publication Data
US 2012/0189403 A1 Jul. 26, 2012

(51) Int. Cl.
*F16B 37/04* (2006.01)

(52) U.S. Cl.
USPC ............ 411/181; 411/172; 411/183; 411/427

(58) Field of Classification Search
USPC ......... 411/172, 180, 181, 182, 183, 427, 431, 411/436; 16/2.1, 2.3, 2.4
See application file for complete search history.

(56) References Cited

U.S. PATENT DOCUMENTS

| | | | | |
|---|---|---|---|---|
| 2,122,054 A * | 6/1938 | Curtis | ........................... | 285/204 |
| 2,385,927 A * | 10/1945 | Mason | .......................... | 411/247 |
| 3,007,364 A * | 11/1961 | Dickie | ........................... | 411/15 |
| 3,204,679 A * | 9/1965 | Walsh | ............................ | 411/180 |
| 3,461,936 A * | 8/1969 | Rosan, Sr. | ...................... | 411/180 |
| 3,465,637 A * | 9/1969 | Cushman et al. | ............... | 411/40 |
| 3,568,230 A * | 3/1971 | Rosan, Sr. | .......................... | 470/8 |
| 3,750,525 A * | 8/1973 | Waters et al. | ................... | 411/34 |
| 4,443,173 A | 4/1984 | Mansberger, II | | |
| 4,557,649 A * | 12/1985 | Jeal | ................................. | 411/40 |
| 4,774,749 A | 10/1988 | Furumura | | |
| 6,761,520 B1 * | 7/2004 | Dise | ................................. | 411/38 |
| 2001/0026746 A1 * | 10/2001 | Calandra et al. | .............. | 411/436 |
| 2002/0012578 A1 * | 1/2002 | Duran et al. | .................... | 411/427 |
| 2004/0141826 A1 * | 7/2004 | Babej et al. | .................... | 411/181 |
| 2005/0031433 A1 * | 2/2005 | Neri | ............................... | 411/180 |
| 2005/0095078 A1 * | 5/2005 | Makino | .......................... | 411/183 |
| 2008/0193254 A1 * | 8/2008 | Selle et al. | ..................... | 411/188 |

FOREIGN PATENT DOCUMENTS

| | | |
|---|---|---|
| DE | 74 40 446 | 4/1975 |
| DE | 101 60 185 A1 | 6/2003 |
| EP | 1 136 231 A2 | 9/2001 |
| EP | 2 168 750 A1 | 3/2010 |
| JP | A-5-269791 | 10/1993 |
| JP | A-6-48447 | 2/1994 |
| JP | A-8-156013 | 6/1996 |
| JP | A-2004-42561 | 2/2004 |
| JP | A-2006-322500 | 11/2006 |
| JP | A-2008-73885 | 4/2008 |
| WO | WO 2006/050716 A1 | 5/2006 |

* cited by examiner

*Primary Examiner* — Roberta Delisle
(74) *Attorney, Agent, or Firm* — Oliff & Berridge, PLC

(57) ABSTRACT

A tapped insert to be insert molded comprises a shank provided at its axial ends with flanges delineating two axially opposite heads of the insert. The shank is provided with an internally threaded axial section to form a tapping. Means for blocking the insert in rotation after insert molding and means for blocking the insert axially in translation after insert molding are arranged on the outside of the shank. The shank comprises at least one fusible area of greater axial deformability located between the threaded axial section and one of the heads. The fusible area is configured to deform under a predefined axial compressive force applied to the heads without causing deformation of the threaded axial section.

The invention also relates to a method for insert molding such an insert.

10 Claims, 1 Drawing Sheet

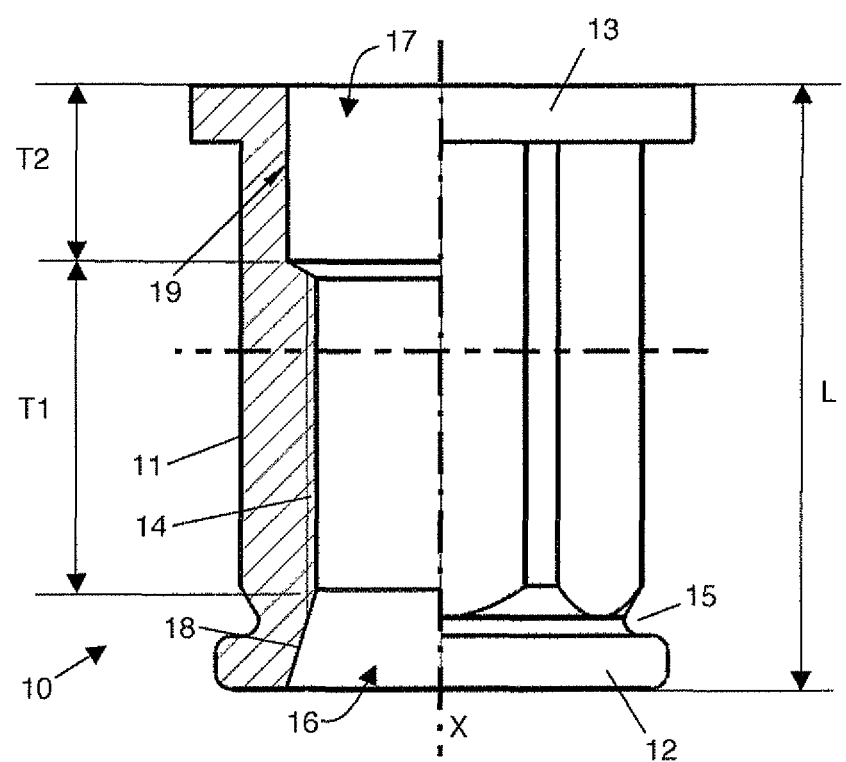

TAPPED INSERT TO BE INSERT MOULDED AND INSERT MOULDING METHOD

BACKGROUND OF THE INVENTION

The invention relates to a tapped insert to be insert moulded comprising a shank provided at its axial ends with flanges delineating two axially opposite heads of the insert, said shank being provided with an internally threaded axial section to form a tapping, means for blocking the insert in rotation after insert moulding and means for blocking the insert axially in translation after insert moulding being arranged on the outside of the shank.

The invention also relates to a method for insert moulding a tapped insert to be insert moulded comprising a shank provided at its axial ends with flanges delineating two axially opposite heads of the insert, said shank being provided with an internally threaded axial section to form a tapping, and externally on the one hand with means for blocking the insert in rotation after insert moulding and on the other hand with means for blocking the insert axially in translation after insert moulding.

STATE OF THE ART

Several types of tapped fixings to be inserted in insert moulded parts exist: fixings to be inserted after moulding of the part or fixings to be inserted before moulding. The invention relates to the field of the second type mentioned therefore consisting in the field of insert moulding a tapped insert.

Conventionally, such a tapped insert comprises a tapping over its whole height and is obtained by turning so that the means for blocking the insert in rotation after insert moulding can consist in a cross-knurling formed on the outer surface of the shank. Grooves of square cross-section can further be formed at the join between each of the heads and the outer surface of the rest of the shank.

One insert moulding technique consists in bringing the insert described above to press via one of its heads on a first part of an insert moulding mould, and in then bringing a second part of the mould to press thereon until the mould is closed. The height between the two parts of the mould after closing is constant for a given mould but variable from one mould to the other. Likewise the axial length between heads of the inserts used is variable according to manufacturing, generally within given tolerance limits.

It results from these two variable parameters that the insert is either too short axially in comparison with the height between the two parts of the mould after closing, or that it is too long. In the former case, the quality of the insert moulding is mediocre because of an accidental engagement of material between one of the heads of the insert and the corresponding mould part. In the latter case, closing of the mould is accompanied by irreversible damage to the insert tapping resulting in a mediocre quality of the insert moulded part.

The document JP08156013 describes an insert to be insert moulded provided with two heads and an internal bore comprising a thread. The insert comprises a groove concentric to the thread on its outer surface.

OBJECT OF THE INVENTION

The object of the invention consists in providing an insert jointly palliating the risk of accidental engagement of material between one of the heads of the insert and the corresponding mould part, and the risk of damaging the insert tapping.

The insert according to the invention is remarkable in that the shank comprises at least one fusible area of greater axial deformability located between said threaded axial section and one of the heads, configured to deform under a predefined compressive force applied to the heads without causing deformation of said threaded axial section.

Such a fusible area has the effect of enabling the axial length of the insert to be shortened due to the effect of a predefined axial load, for example in case of closing of an insert moulding mould, without causing deformation and damage to the tapping.

The insert moulding method according to the invention is for its part remarkable in that it consists in:
  bringing one of the heads of the insert to press against a first part of an insert moulding mould,
  bringing a second part of the mould to press against the other head of the insert,
  bringing nearer the two parts of mould by applying an axial compressive force on the heads of the insert to deform at least one fusible area of greater axial deformability located between said threaded axial section and one of the heads, without causing deformation of said threaded axial section, until the mould is completely closed,
  injecting an insert moulding material into the mould around the insert.

BRIEF DESCRIPTION OF THE DRAWINGS

Other advantages and features will become more clearly apparent from the following description of a particular embodiment of the invention given for non-restrictive example purposes only and represented in the single appended drawing representing an example of a tapped insert according to the invention in longitudinal half cross-section.

DESCRIPTION OF A PREFERRED EMBODIMENT OF THE INVENTION

The single appended FIGURE represents an example of a tapped insert 10 to be insert moulded according to the invention. The right-hand part represents the insert from the outside, whereas the left-hand part is an axial cross-section.

Insert 10 comprises a shank 11 in the form of a tube directed along an axis of revolution materializing the axial direction X of the insert. Shank 11 is provided at its axial ends with outwardly-directed transverse flanges thereby delineating two axially opposite heads 12, 13 of the insert. The axial length of the insert is marked L.

Between heads 12, 13, shank 11 is provided with an internally threaded axial section T1 to form a tapping 14 over at least a part of axial length L of the insert. Such a tapping 14 is designed to collaborate with tightening means (not shown) of screw or bolt type after insert moulding.

Shank 11 bears means for blocking insert 10 in rotation after insert moulding and means for blocking the insert axially in translation after insert moulding. These two types of means which are complementary by their mechanical functions are arranged on the outside of the shank. The rotation prevention means are for example achieved by the fact that, over at least a part of its axial length L, the outer surface of shank 11 is a cylinder the directing curve of which presents a polygonal shape. By definition, a cylinder is a surface of the space defined by a line called the generating line passing through a variable point describing a closed flat curve, called directing curve, and keeping a fixed direction.

At the join between one 12 of heads 12, 13 of insert 10 with the outer surface of the rest of shank 11, an annular groove 15 is formed made externally in the shank in a plane perpendicular to its axis X. The cross-section of the groove is for example globally V-shaped with a rounded bottom. In this case, it is possible to provide for one of the sides walls of the groove to be perfectly transversal, i.e. perpendicular to the direction X, but for the other side wall of the groove 15 to be inclined in the direction of the other head. The prime function of such a groove is to form the means for blocking the insert axially in translation after insert moulding.

In the example illustrated, the full height of the outer surface of the shank separating heads 12, 13 is a cylinder whose directing curve presents a polygonal shape, for example hexagonal, except for the area where groove 15 is formed.

In non-restrictive manner, insert 10 is for example passthrough, i.e. the inner duct opens out at both ends through the two heads 12, 13 at the level of two openings 16, 17. The part of this duct joining tapping 14 to opening 16 opening out in head 12 can be formed by a cone 18 tapered in the direction of corresponding head 12.

A bore 19 is arranged on axial section T2 of shank 11 distinct from threaded axial section T1 and joining head 13 opposite head 12 on the side where groove 15 is located. Bore 19 presents a larger internal diameter than the diameter of tapping 14. This bore 19 has the effect of constituting a reduction of the thickness of shank 11 along axial section T2 with respect to that along threaded axial section T1.

According to the invention, shank 11 comprises at least one fusible area of greater axial deformability located between threaded axial section T1 and one of the heads 12, 13. The fusible area is configured to deform under a predefined axial compressive force applied to heads 12, 13 without causing deformation of threaded axial section T1 and therefore of tapping 14.

A first fusible area is formed by the arrangement of bore 19. A second fusible area can be formed by annular groove 15, the action of which can be reinforced on the inner side by the arrangement of cone 18.

At the distal ends of threaded axial section T1 (ends oriented along the axis of section T1), the thread can, as in the example of the single FIGURE, be interrupted so as to enable formation of said at least one fusible area, preferably directly, following said threaded axial section T1. In other words, the fusible area does not comprise any threading internally to the shank. Thus, after deformation of the fusible area, it will always be possible to screw-tighten a corresponding element into the insert. Unlike the threading, the insert can comprise a bore 19 as described in the foregoing enabling the element whose thread corresponds to the tapping of threaded axial section T1 to be easily screw-tightened, even after deformation of the fusible area, this bore preventing for example the formation of a pad internally to the shank preventing passage and screw-tightening of the element.

In an advantageous manufacturing technique, insert 10 can be produced by cold heading. The invention can further be applied indifferently to a blind insert, i.e. the internal duct delineated by the shank only opens out onto one of the heads at the level of a single opening.

One technique for insert moulding the tapped insert 10 consists in bringing insert 10 described in the foregoing to press via one of its heads 12, 13 on a first part of an insert moulding mould, and in then bringing a second part of the mould to press thereon until the mould is closed. An advantageous technique consists in providing for the height between two parts of the mould after closing to be slightly smaller than the expected axial length L, the difference between axial length L of insert 10 and the height between the two parts of mould being smaller than the axial deformation ability of the fusible area equipping the insert.

This results in, when the second mould part is fitted, the latter in a first stage comes into contact with head 13 of the insert without reaching the closed position of the mould. Then a mechanical force is applied to the second mould part to continue movement thereof until closing is achieved, accompanied by transmission to the insert of an axial compressive force applied to heads 12, 13 of greater value than the predefined axial compressive force above which the fusible area of the insert is designed to deform. Finally the insert moulding material can be injected in the insert moulding mould.

In other words, a method for insert moulding of tapped insert 10 to be insert moulded described in the foregoing consists in:
bringing one 12 of heads 12, 13 of insert 10 to press on a first part of an insert moulding mould,
bringing a second part of the mould to press on the other head 13 of insert 10,
bringing nearer the two parts of mould by applying an axial compressive force on heads 12, 13 of insert 10 to deform at least one fusible area of greater axial deformability located between threaded axial section T1 and one of heads 12, 13, without causing deformation of this threaded axial section T1, until closing of the mould is achieved,
injecting an insert moulding material into the mould around the insert.

The invention claimed is:

1. A tapped insert to be insert moulded, comprising a shank provided at its axial ends with flanges delineating two axially opposite heads of the insert, said shank being provided with an internally threaded axial section to form a tapping, means for blocking the insert in rotation after insert moulding and means for blocking the insert axially in translation after insert moulding being arranged on the outside of the shank, the shank comprising at least one fusible area of greater axial deformability located between said threaded axial section and one of the heads, configured to deform under a predefined axial compressive force applied to the heads without causing any deformation of said threaded axial section.

2. The insert according to claim 1, wherein the fusible area is formed by an annular groove made externally in the shank in a plane perpendicular to its axis.

3. The insert according to claim 1, wherein the fusible area is formed by a bore arranged on an axial section of the shank distinct from the threaded axial section and having a larger internal diameter than the diameter of the tapping.

4. The insert according to claim 1, wherein over at least a part of its axial length, the outer surface of the shank is a cylinder a directing curve whereof presents a polygonal shape.

5. The insert according to claim 1, wherein it is produced by cold heading.

6. The insert according to claim 1, wherein it is passthrough.

7. The insert according to claim 1, wherein it is blind.

8. A method for insert moulding the tapped insert according to claim 1, the method comprising:
bringing one of the heads of the insert to press on a first part of an insert moulding mould,
bringing a second part of the mould to press on the other head of the insert,
bringing nearer the two parts of mould by applying an axial compressive force on the heads of the insert to deform the at least one fusible area of greater axial deformability located between said threaded axial section and one of the heads, without causing any deformation of said threaded axial section, until closing of the mould is achieved, and injecting an insert moulding material into the mould around the insert.

9. A tapped insert comprising:

a first flange defining a first head;

a second flange defining a second head opposite to the first head;

a shank disposed between the first and second heads, the shank including:

an internally threaded axial section to form a tapping; and at least one fusible area of greater axial deformability located between said internally threaded axial section and one of the heads;

the shank being configured to deform under a predefined axial compressive force applied to the heads without causing any deformation of said threaded axial section;

a rotational blocker configured to block rotation of the insert and arranged on the outside of the shank; and a translation blocker configured to block translation of the insert in an axial direction and arranged on the outside of the shank.

10. The tapped insert according to claim 9, wherein:

the shank comprises a first fusible area of greater axial deformability and a second fusible area of greater axial deformability;

the first fusible area of greater axial deformability is located between the threaded axial section and the first head; and the second fusible area of greater axial deformability is located between the threaded axial section and the second head.

* * * * *